June 28, 1966  A. E. RELATION ET AL  3,258,674
INVERTER MALFUNCTION PROTECTION
Filed March 15, 1963  4 Sheets-Sheet 1

WITNESSES:
Bernard R. Giguey
Leon J. Vaga

INVENTORS
Alfred E. Relation and
Roy A. Colclaser.
BY
John L. Houghton
ATTORNEY

United States Patent Office 3,258,674
Patented June 28, 1966

3,258,674
INVERTER MALFUNCTION PROTECTION
Alfred E. Relation, Ellicott City, Md., and Roy A. Colclaser, Delmont, Pa., assignors to Westinghouse Electric Corporation, Pittsburgh, Pa., a corporation of Pennsylvania
Filed Mar. 15, 1963, Ser. No. 265,554
20 Claims. (Cl. 321—18)

This invention relates generally to inverters for inverting direct current into alternating current, and more particularly, to a network for controlling the operation of such an inverter in which short circuiting of the direct current source is prevented.

Inverters which use discontinuous type control valves (valves in which the control circuit thereof controls the initiation of current through the associated power circuit but which are ineffective to turn off the current through its associated power circuit once current has been established) must be provided with means for interrupting the current flow externally of the control valve. Various schemes have been suggested as, for example, the insertion of a filter network between the inverter and the load so that a capacitive reactance characteristic is presented to the inverter even though the load which is supplied by the filter is inductive in nature. Such an arrangement is disclosed and claimed in the copending application of Alfred E. Relation and Robert W. Lucky, Serial No. 159,694, filed December 15, 1961, now Patent No. 3,118,105, dated January 24, 1964, and assigned to the same assignee as this application.

This arrangement works very satisfactorily when the power factor of the load remains fairly constant. Theoretically, the magnitude of the filter components could be such that for any possible magnitude of inductive reactance of the load a capacitive reactance will be presented to the inverter. However, for space, weight and economy reasons the filter element should be kept as small as possible. Under these conditions and with a load of varying inductive reactance such as an electric motor, it is possible that the filter might not present a capacitive reactance to the inverter. If this occurs, the filter would not be able to interrupt the current flow through the discontinuous control type semiconductor valves prior to the rendering of the second set of valves conductive. The result of such an occurrence would be to establish a low impedance path across the direct current supply which if not immediately interrupted would result in a destruction of the inverter itself.

It is an object of this invention to provide means which is sensitive to current flow through the valve devices for preventing the firing of the subsequent to be fired valve devices if the current flow through the previously conducting devices is still flowing.

A further object of this invention is to provide in such an arrangement, a time delay for insuring a finite time interval between the time that the previously conducting valves terminate their conduction and the time that the subsequently to be rendered conductive valves are rendered conductive.

A further object of this invention is to provide a current sensor responsive to current flow through the valve devices for energizing a signal control, located intermediate the signal source and the inverter, for interrupting flow of firing signals to the inverter if a prior to be conducting valve has not terminated conduction.

A further object of this invention is to provide a voltage which alternates in polarity in response to current flow through the valves located in the two current paths of the inverter which when combined with the alternating voltage signal source will substantially neutralize the signal source voltage which would fire the subsequently to be fired valves if the prior to be fired valves are still conducting.

A still further object of this invention is to use a current transformer as the current sensor, to locate the current transformer intermediate the inverter and the load, and to connect the output of the current transformer across an impedance device which will establish a voltage thereacross in response to the existence of current flow through the primary of the current transformer and which is substantially independent of the magnitude of this current.

A still further object of this invention is to provide in such an arrangement means energized by the output voltage of the inverter for causing the phase of the current generated in the secondary winding to be lagging with respect to the current flow between the inverter and the load.

A still further object of this invention is to provide the current sensor intermediate the inverter and the filter network which supplies the load.

Other objects will be apparent from the specification, hereinafter appended claims and the drawings, in which:

Figure 1:
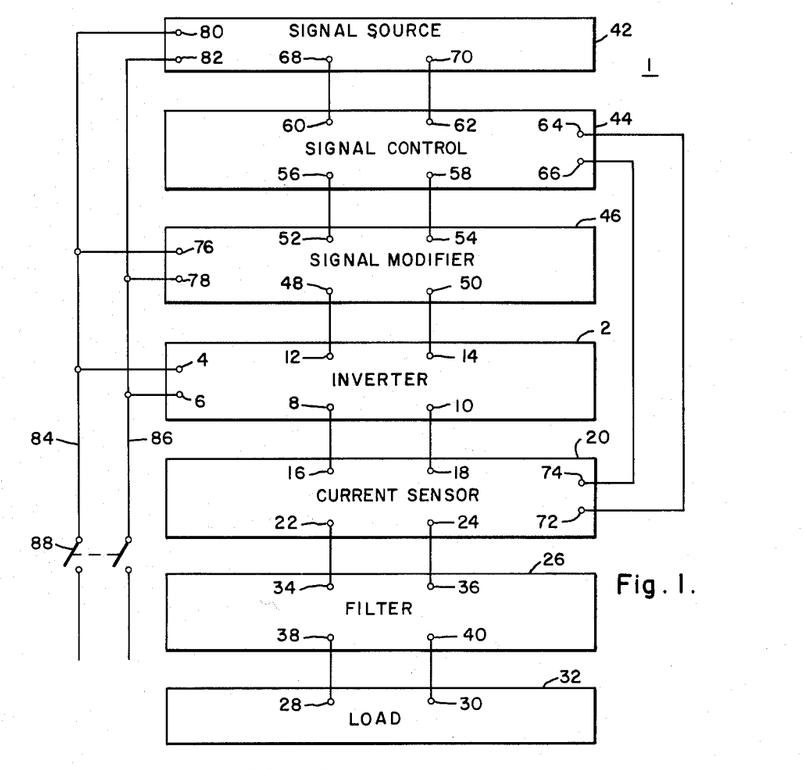
FIGURE 1 is a block diagram illustrating an inverting apparatus embodying the invention.

Referring to the drawings by characters of reference, the numeral 1 designates an inverting apparatus. The apparatus 1 comprises an inverter 2 having power input terminals 4 and 6, power output terminals 8 and 10 and control input terminals 12 and 14. The output terminals 8 and 10 of the inverter 2 are connected to input terminals 16 and 18 of a current sensor 20; the output terminals 22 and 24 of which are connected through a filter 26 to the input terminals 28 and 30 of an alternating current load 32. More specifically, the filter 26 is provided with input terminals 34 and 36 connected respectively to the output terminals 22 and 24 of the sensor 20 and is provided with output terminals 38 and 40 which are connected to the input terminals 28 and 30 of the load 32.

The load 32 may have many characteristics. The invention is particularly desirable when the load is inductive in nature and especially desirable when the power factor of such load may become highly lagging for short intervals, such as an electric motor. With such a device, the magnitude of the inductive impedance of the load 32 will normally be within a predetermined range but under certain circumstances it may become highly inductive and overcome the capacitive characteristics of the filter 26 so that the impedance reflected by the output terminals 34 and 36 to the inverter 2 will no longer be capacitive in nature. In such an event, the sensor 20 senses the continued conduction of the inverter valves and prevents further firing of the inverter valves. The load 32 may take other forms in which the magnitude of its inductive reactance varies or even though the magnitude of the inductive reactance of the load 32 does not ordinarily vary it might vary due to transients which cause the filter 26 to present other than a capacitive reactance to the output terminals 8 and 10 of the inverter 2.

The inverter 2 is actuated from a signal source 42 through a signal control 44 and a signal modifier 46. The signal input terminals 12 and 14 of the inverter 2 are connected respectively to output terminals 48 and 50 of the signal modifier 46; the input terminals 52 and 54 thereof being connected to the output terminals 56 and 58 respectively of the signal control 44.

The signal control 44 is provided with two sets of input terminals 60–62 and 64–66 which are connected to the output terminals 68–70 of the signal source 42 and 72–74 of the current sensor 20 respectively. Unidirectional power is supplied to the input terminals 4 and 6 of the inverter 2; 76–78 of the signal modifier 46; and 80–82 of the signal source 42 from a pair of direct current power supplying buses 84 and 86, respectively. A disconnect switch 88 is provided in the buses 84 and 86 for disconnecting the input power from the inverting network 1.

Figure 4:
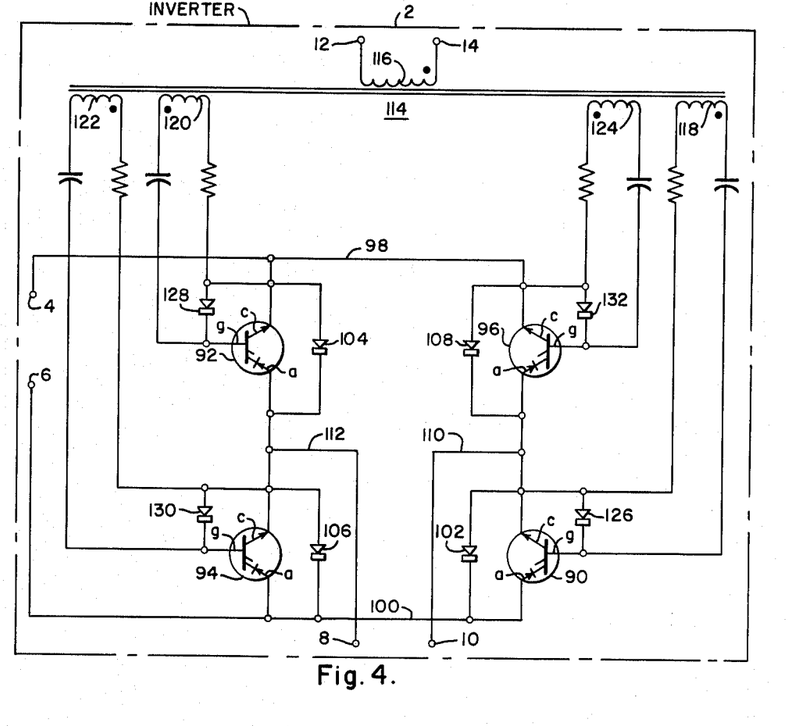
FIG. 4 is a schematic diagram of an inverter suitable for use in FIGURE 1.

The inverter 2 may take the form as illustrated in FIGURE 4 or may take many widely different forms in which a pair of power energy conducting paths interconnect the input terminals 4 and 6 with the output terminals 8 and 10 and which paths include at least one electric valve for controlling the flow of energy from the input terminals 4 and 6 to the output terminals 8 and 10. In its most generic concept, the invention contemplates the use of continuous control type valves as well as valves of the discontinuous control type and loads which may have either a leading or a lagging power factor. In the event that discontinuous control type valves are utilized, filter 26 or other means must be provided to terminate current through the discontinuous control type valves whereby they become non-conducting prior to the rendering of the subsequent to be conductive valves conducting. Since the filter 26 is reactive, current will flow during the interval after termination of conduction through one valve or set of valves and the initiation of conduction of the other valve or set of valves. For this purpose, diodes are provided in the power paths to permit power to be returned to the source.

The inverter as illustrated in FIGURE 4 is of the bridge type utilizing two pairs of discontinuous control type valves 90–92 and 94–96. The valves 90, 92, 94 and 96, as illustrated, are semiconductor discontinuous control type valves commonly known as controlled rectifiers. Each is provided with a cathode $c$, an anode $a$ and a gate $g$. When the gate $g$ is rendered positive with respect to the associated cathode $c$, the controlled rectifier is rendered conducting to pass current from its anode $a$ to its cathode $c$.

The cathodes $c$ of the controlled rectifiers 92 and 96 are connected to a common cathode bus 98 which connects with the power input terminal 4 supplied by the negative potential power supply bus 84. Likewise, the anodes $a$ of the controlled rectifiers 90 and 94 are connected to an anode bus 100 which connects with the power input terminal 6 and therethrough to the positive potential power supply bus 86. The cathode $c$ of the rectifier 90 and anode $a$ of the rectifier 96 are connected together and to the power output terminal 10 by means of a power bus 110. Likewise, the cathode $c$ of the controlled rectifier 94 and the anode $a$ of the controlled rectifier 92 are connected together and to the power output terminal 8 by means of a power bus 112. Diodes 102, 104, 106 and 108 are connected respectively in anti-parallel with the controlled rectifiers 90, 92, 94 and 96.

Initiation of conduction of the sets of controlled rectifiers 90–92 and 94–96 is controlled by a control transformer 114 having a primary winding 116 and secondary windings 118, 120, 122 and 124. The terminals of winding 116 are connected to the control input terminals 12 and 14. One terminal of each of the four secondary windings 118, 120, 122 and 124 are individually connected through individual resistors to the cathodes $c$ of the valves 90, 92, 94 and 96 respectively. The other terminals of the windings 118, 120, 122 and 124, are individually and respectively connected through capacitors to the gates $g$ of the same valves 90, 92, 94 and 96. In order to limit the reverse voltage between the cathode and gate of the valves, diodes 126, 128, 130 and 132 are individually and respectively shunt connected between cathode and gate of the rectifiers 90, 92, 94 and 96.

The inverter 2 as illustrated may be operated from an alternating voltage having pulse cycles up to 180° duration or may be operated from an alternating potential in which the length of half-cycles is foreshortened to a very few degrees duration. In the event that the latter or pulse type of control voltage is applied to the transformer 114, the capacitors connected in the circuits of the secondary windings of this transformer 114 could be dispensed with although the retention there even with the short duration alternating pulses applied to the transformer 114 is desirable, in some instances, to insure good positive operation of the controlled rectifiers 90, 92, 94 and 96.

The operation of the inverter 2 is as follows: assuming that a direct current potential is applied between the input terminals 6 and 4, a load is connected to the output terminals 8 and 10 and a control voltage is applied to the control input terminals 12 and 14. The transformer 114 will apply firing pulses to fire the pairs of controlled rectifiers 90–92 and 94–96. Assuming an instant in which the terminals of the windings 118 and 120 which are connected to the gates $g$ are positive with respect to the terminals of these windings connected to the cathodes $c$, a firing current pulse will be supplied, gate to cathode, to the controlled rectifiers 90 and 92. This will render these rectifiers conducting and current will flow from the positive terminal 6 through the anode bus 100, anode to cathode in the rectifier 90, bus 110 and the power output terminal 10 to the load connected thereto. Current returns from the load through the power output terminal 8, the bus 112, anode to cathode in the rectifier 92 and cathode bus 98 to the negative supply terminal 4.

Assuming that the load reflected to the terminals 8 and 10 is capacitive in nature, the current through the just mentioned energy path will terminate prior to the reversal of the control potential supplied to the primary winding 116. This termination of current flow causes the controlled rectifiers 90 and 92 to become non-conducting. Because of the reactive nature of the load connected to terminals 8 and 10, the current flow will reverse and will flow from terminal 10 through bus 110, diode 102, anode bus 100, terminal 6, bus 86, power supply (not shown), but 84, bus 98, diode 104 and bus 112 to the terminal 8. At a predetermined subsequent time, the voltage applied to the input winding 116 of the transformer 114 will reverse whereby the secondary windings 122 and 124 will supply a positive to negative pulse gate to cathode of the controlled rectifiers 94 and 96 respectively. These controlled rectifiers thereupon become conducting and conduct current from the power input terminal 6 through the anode bus 100, anode to cathode in the controlled rectifier 94, bus 112, power output terminal 8, the associated load, power output terminal 10, bus 110, anode to cathode in the rectifier 96 and cathode bus 98 to the negative power supply terminal 4. Current will continue to flow in this power conducting path until such time as the capacitive nature of the load causes the current to reduce to zero and then reverse. As the current reduces to zero, the controlled rectifiers 94 and 96 become nonconductive and when the current reverses the power will flow from the load back to the direct current source through the diodes 106 and 108 in much the same manner as above described.

It will be appreciated that if for some reason or other, one or both of the rectifiers 90 and 92 were conducting at the time that the controlled rectifiers 94 and 96 were rendered conducting a short circuit would be imposed between the anode and cathode buses 100 and 98 which, unless immediately interrupted, could cause complete destruction of one or more of the inverter components. To prevent this from occurring, the signal modifier 46 is prevented from energizing primary winding 116 sufficiently to fire the subsequent-to-be-fired valves.

Figure 3:
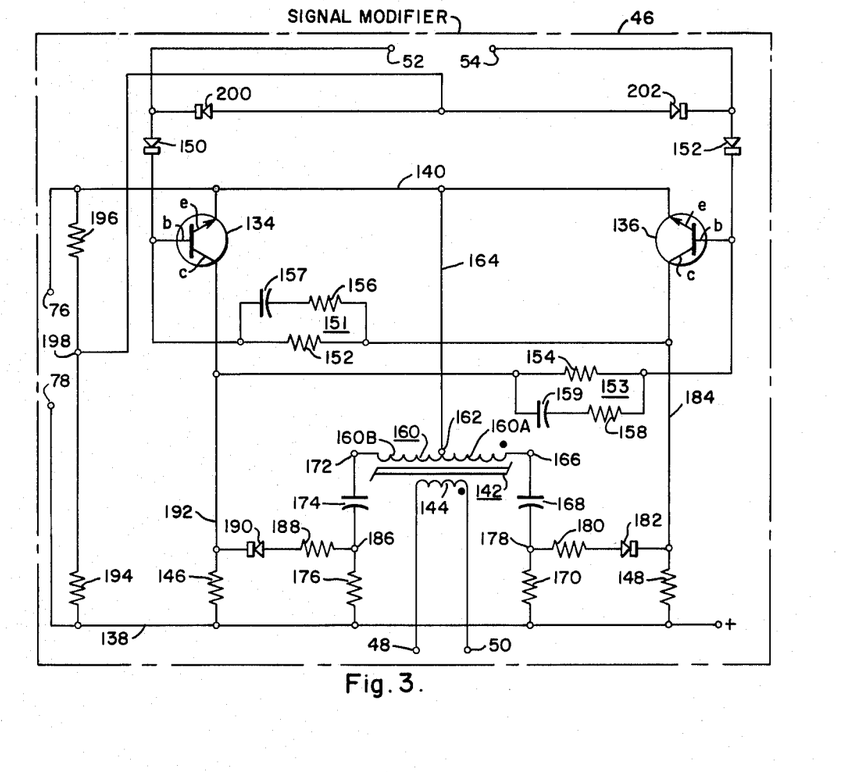
FIG. 3 is a schematic diagram of signal modifier for use in FIGURE 1.

The signal modifier or pulse generator 46, which supplies actuating pulses to the primary winding 116, is illustrated in detail in FIGURE 3. This signal modifier may take the form of a flip-flop having control valves or transistors 134 and 136 connected between anode and cathode buses 138 and 140 for energizing a saturating core type output transformer 142, the secondary winding 144 of which is connected to its output terminals 48 and 50. The flip-flop is bistable in character in that a suitable pulse must be applied to the input terminals 52 and 54 to reverse the conductive conditions of the transistors 134 and 136.

More specifically, the collector $c$ of the transistor 134 is connected to a positive potential bus 138 through a voltage dropping resistor 146. The emitter $e$ of this transistor is connected to the negative potential bus 140. Similarly, the collector $c$ and emitter $e$ of the transistor 136 are connetced through a voltage dropping resistor 148 to the positive bus 138 and to the negative bus 140. In order to fire or render transistor 134 conductive, its base $b$ is connected to the input terminal 52. The diode 150 is located in this connection and is polarized so that it conducts drive current from the terminal 52 to the base $b$. The return path from the emitter $e$ is through a biasing resistor 196, connection 198, and diode 202 to the other input terminal 54. One end of the resistor 196 is connected to the bus 140. The other terminal 198 is connected through a resistor 194 to the bus 138. Similarly, the base $b$ of the transistor 136 is connected through a diode 152 to the terminal 54. Its return path is from the emitter $e$ through resistor 196 and diode 200 to terminal 52. The relative magnitudes of the resistors 194 and 196 determine the voltage drop across the resistor 196 and the threshold voltage of the modifier 46. The threshold voltage is the difference between the forward voltage drops of the sets of diodes 150–202 and 152–200 of the the voltage drops between the bases and emitters of the transistors 134 and 136. The magnitude of the drop across the resistor 196 is chosen to provide a threshold voltage for actuating the pulse signal modifier which is less than the output voltage of the signal control 44 with no blocking signal from the sensor 20 but greater than the output voltage with a blocking signal from the sensor 20.

In order to provide feedback to maintain the conducting one of the transistors 134 and 136 conducting and the blocked one of the same transistor blocked, the base $b$ of the transistor 134 is connected through a network 151 to the common connection 184 of the collector $c$ of transistor 136 and the voltage dropping resistor 148. The network 151 comprises a first resistor 152 shunted by a second resistor 156 series connected with a capacitor 157. Likewise, the network 153 comprises a resistor 154 shunted by a resistor 158 series connected with a capacitor 159. The capacitors 157 and 159 enhance the rapidity of the switching of the transistors.

The transformer 142 is provided with a primary winding 160 having a center tap 162 connected by conductor 164 to the negative bus 140. One end terminal 166 of the winding 160 is connected through a capacitor 168 and a resistor 170 to the positive bus 138. The other end terminal 172 of the winding 160 is connected through a capacitor 174 and resistor 176 to the positive bus 138. In order to provide for changing the potential of the terminal 166, the common terminal 178 between the capacitor 168 and the resistor 170 is connected through a resistor 180 and diode 182 to the common connection 184. Similarly, the common connection 186 between the resistor 176 and capacitor 174 is connected through a resistor 188 and diode 190 to the common connection 192.

The operation of the pulse modifier is as follows: assuming a state of operation in which the transistor 136 is conducting, the potential of the connection 184 will be substantially that of the negative bus 140 while that of the connection 192 will be substantially that of the positive bus 138. Under these conditions the transistor 136 will be maintained conductive by a drive current which flows from the bus 138 through resistor 146, network 153, and base to emitter of the transistor 136 to the negative bus 140. Since the potential of the connection 184 is substantially that of the cathode bus 140, no drive current will be supplied to the transistor 134 and this transistor will remain non-conducting.

When a signal greater than the threshold magnitude of the modifier 46 is applied positive to negative between the input terminals 52 and 54, drive current will flow from the terminal 52 through diode 150, base to emitter of the transistor 134, the resistor 196, terminal 198 and the diode 202 to the negative terminal 54. The flow drive current to the transistor 134 causes it to commence to conduct thereby reducing the potential of the connection 192. The charge on the capacitor 159 lowers the potential of the base $b$ of the transistor 136 which thereupon tends to come out of saturation decreasing current flow therethrough and increasing the potential of the connection 184. As the potential of the connection 184 raises, current will flow therefrom through the network 151 and base to emitter in the transistor 134 increasing the current flow through the transistor 134. This increased current further decreases the potential of the connection 192 which further reduces the current flow through the transistor 136. Because of this feedback operation, the transistor 134 rapidly becomes fully conductive and the transistor 136 rapidly becomes blocked. The capacitor 157 of the network 151 increases the rate at which the transistor 134 becomes conductive while the capacitor 159 of the network 153 increases the rate at which the transistor 136 becomes blocked.

The signal modifier 46 will remain in this condition with the transistor 134 conducting and the transistor 136 blocked until such time as the output signal applied between the input terminals 52 and 54 reverses at which time the transistor 136 will become conducting and the transistor 134 fully blocked in substantially the same manner as recited above with respect to the rendering of the transistor 134 conducting and the transistor 136 blocked.

During the interval in which the transistor 136 is conducting, the potential of the connection 184 is substantially that of the negative bus 140. The relative magnitudes of the resistors 170 and 180 are such that the potential of the terminal 178 will approach that of the connection 184. Therefore, any accumulated charge on capacitor 168 will discharge through resistor 180, diode 182, transistor 136 and the section 160A of the winding 160. Since the transistor 134 is blocked and connection 192 is substantially of the same potential as that of the positive bus 138, current will flow from the bus 138 through resistor 176, capacitor 174, winding section 160B of winding 160 and connection 164 to the negative bus 140. The current flow through winding sections 160A and 160B as described will cause a flux change in the core of the transformer 160 whereby a control pulse of voltage $V_{46}$ (FIG. 9) will be applied between the output terminals 48 and 50. The magnitude of the capacitance of the capacitors 168 and 174 is such that its discharging and charging current is sufficient to permit the core of the transformer 142 to saturate.

When the transistor 134 is rendered conducting and the transistor 136 is blocked, the potential of the connections 184 and 192 will reverse, the capacitor 174 will discharge through the winding section 160B and capacitor 168 will charge through winding section 160A to drive the core of the transformer 142 into saturation in the opposite direction to cause a voltage pulse to appear between the output terminals 48 and 50 in the opposite polarity to that which occurred when the transistor 136 became conductive.

Figure 2:
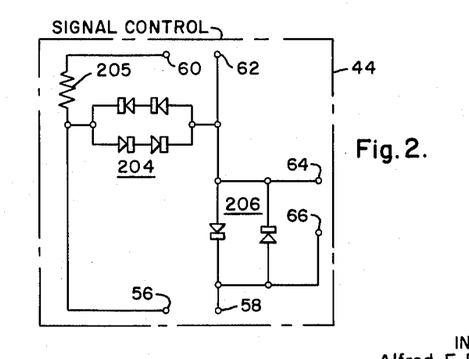
FIG. 2 is a schematic illustration of one form of signal control which may be used in FIGURE 1.

The schematic circuit of the signal control 44 is shown in FIGURE 2 and comprises a first diode network 204 which comprises two pairs of series connected diodes connected in anti-parallel between the input terminals 60 and 62 through a voltage dropping resistor 205. A second diode network 206 is connected between the input terminals 64 and 66 and comprises two diodes. The voltage which may be established between the output terminals 56 and 58 from the output terminals 68 and 70 of the signal source 42 is limited to the forward drop of two series connected diodes. The voltage which may be established between the input terminals 64 and 66 is limited to the forward drop of the diodes connected therebetween. With this arrangement, a first and second substantially square wave voltage will be established across the diode networks 204 and 206 in response to the alternating voltage derived from the signal source 42 and the current sensor 20. The threshold voltage of the modifier 46 is such that when these voltages are of opposite polarity, the voltage which appears between the output terminals 56 and 58 is less than the threshold voltage of the signal modifier. When the voltages across the diode networks 204 and 206 is in additive polarity or there is no signal at 64-66, the voltage between the output terminals 56 and 58 is above the threshold voltage of the signal modifier 46. As will be apparent from FIG. 9, the output voltage $V_{44}$ between the terminals 56 and 58 will alternate in polarity depending upon the relative polarities of the networks 204 and 206. As the polarity of the potential at output terminals 56 and 58 reverses and exceeds the threshold magnitude of the modifier 46, one or the other of the transistors 134 and 136 will be rendered conducting to provide output current pulses at the terminals 48 and 50 for driving the inverter 2.

Figure 5:
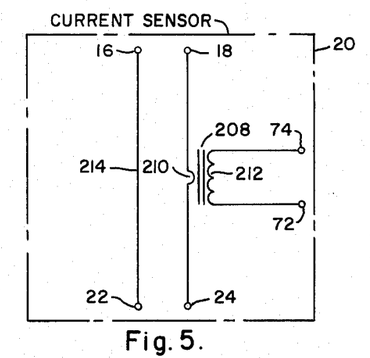
FIG. 5 is a schematic illustration of a current sensor suitable for use in FIGURE 1.

The current sensor 20 is illustrated in FIG. 5 and comprises an energizable element which may take the form of a current transformer 208 having a primary winding 210 connected between its terminals 18 and 24 and a secondary winding 212 connected between its output terminals 72 and 74. The energizable element 208, when current flows therethrough, will establish a voltage across the output connections or terminals 72 and 74 of a polarity and magnitude dependent upon the direction and magnitude of the current flow. The terminals 16 and 22 are connected together by a conductor 214.

Figure 6:
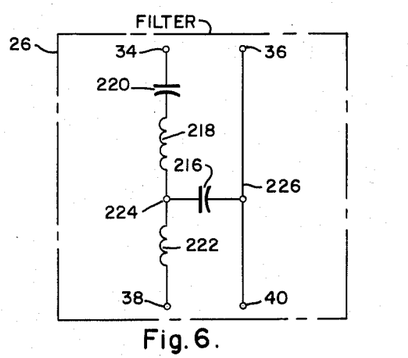
FIG. 6 is a view of filter suitable for use in FIGURE 1.

The filter is illustrated in FIG. 6 and comprises a network comprising a capacitor 216, an inductance 218 and a capacitor 220 series connected in that order between the filter terminals 36 and 34. An inductance 222 is connected between the filter output terminal 38 and a common terminal 224 between the capacitor 216 and the inductance 218. A conductor 226 connects the terminals 36 and 40.

Figure 7:
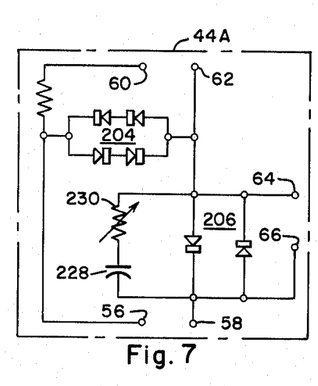
FIG. 7 is a view of modified form of signal control which may be used in FIGURE 1 in place of the control illustrated in FIGURE 2.

FIGURE 7 illustrates a modified form of signal control network 44A similar to the network 44 in which similar elements are identified by the same reference characters. The network 44A includes a capacitor 228 series connected with a variable resistor 230 and connected in shunt with the diode network 206. The capacitor 228 acts to delay the decay the voltage across the network 206 subsequent to termination of the voltage signal applied to its input terminals 64 and 66. This slight time delay or a phase shift is provided between the termination of current flow through the current transformer 208 and the decay of the voltage across the network 206 to provide a time interval sufficient for the conducting ones of the controlled rectifiers 90-92 or 94-96 to assume a condition in which they will withstand the establishment of a voltage potential thereacross.

Figure 8:
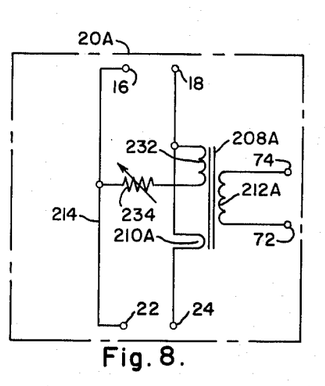
FIG. 8 is a view of modified form of current sensor which may be used in FIGURE 1 in place of the current sensor illustrated in FIGURE 5.

FIGURE 8 illustrates a modified form of current sensor network 20A in which the current transformer 208A has been provided not only with a primary winding 210A and a secondary winding 212A, but a phasing winding 232 which is connected to be energized by the input voltage applied to the input terminals 16 and 18. A variable resistor 234 is connected in series with the phasing winding 232 to control the magnitude of the current through the phasing winding 232 for regulating the amount of phase lag of the output current from the secondary winding 212A.

The current sensor 20 may be used with the signal control 44A or the signal control 44 can be used with the current sensor 20A for providing an increased delayed action in the firing of the inverter 2 subsequent to the termination of current flow in the controlled rectifiers 90-92 and 94-96. It might be desirable to use both the current sensor 20A and the signal control 44A but in most instances this may not be the case.

It is believed that the remainder of the construction of the inverting apparatus 1 may best be described by description of the operation which is as follows: upon closure of the disconnect switch 88, potential is applied to the input terminals 4-6, 76-78 and 80-82 of the inverter 2, the signal modifier 46 and the signal source 42. The details of the signal source 42 have not been illustrated as any suitable apparatus for generating an alternating potential of the desired frequency may be utilized. Upon energization of its input terminals 80 and 82, the signal source develops an alternating output potential between its output terminals 68 and 70. This potential is applied to the input terminals 60 and 62 of the signal control and establishes a square wave alternating potential across the diode network 204. Since at this instant, the inverter 2 will not be conducting, no signal is applied from the current sensor 20 to the input terminals 64 and 66 so that the potential across the output terminals 56 and 58 will be the forward drop through the diode network 204. This potential is greater than the threshold potential of the signal modifier 46 and when the polarity of this potential is such as to render a nonconducting one of the transistors 134 and 136 conducting, one thereof will be rendered conducting as above described.

Assuming that the transistor 136 is blocked and the polarity of the output potential of the signal control is such that the terminal 58 is positive with respect to the terminal 56, current will flow from the terminal 58 to terminal 54 and render the transistor 136 conductive and transistor 134 blocked. Conduction of transistor 136 provides a voltage pulse between the input control terminals 12 and 14 of the inverter 2 which energizes the transformer 114 in one polarity which will be assumed as making the dotter terminals of the windings of the transformer 114 negative with respect to the undotted terminals. Positive potential is applied to the gates of the controlled rectifiers 94 and 96 which thereupon conduct to energize output terminals 8 and 10 at a first polarity; current will flow through the current sensor 20 and the filter 26 to the load 32.

Figure 9:
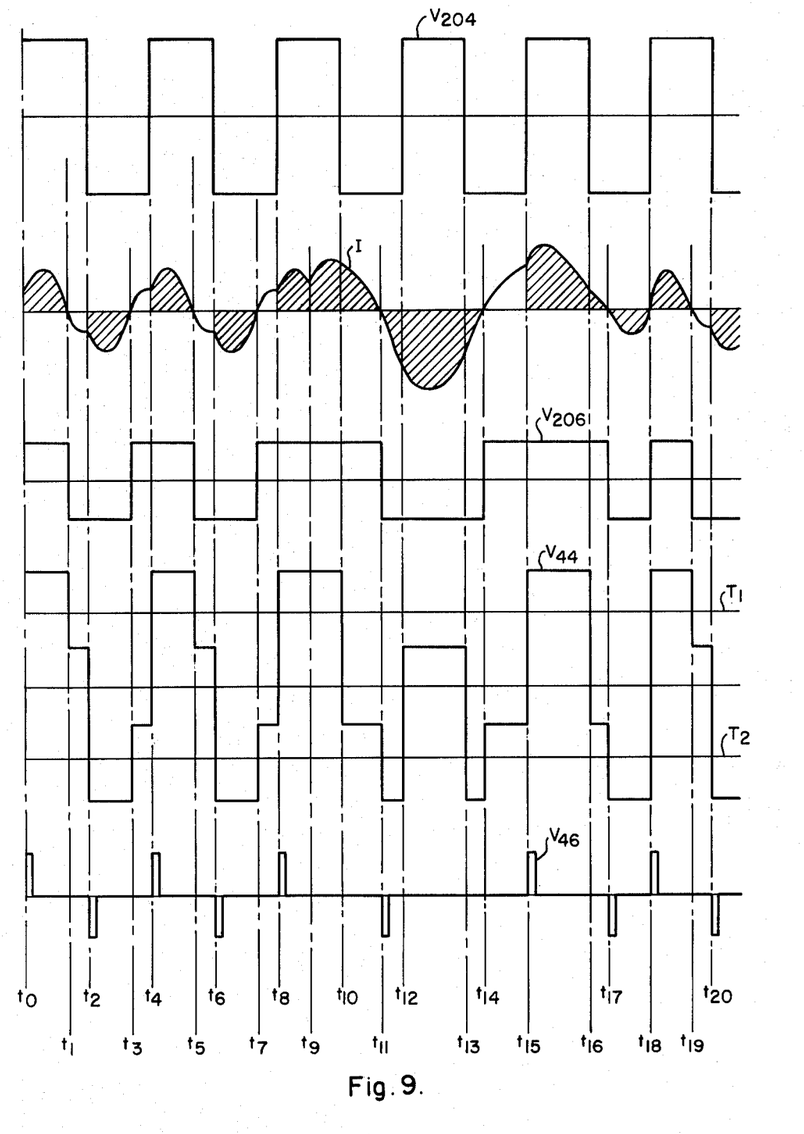
FIG. 9 is a family of curves illustrating the operation of the apparatus illustrated in FIGURE 1.

At some time as determined by the relative magnitudes of the reactances of the filter 26, the current flow from the inverter 12 into the filter 26 will decrease to zero and then reverse. As the current through the controlled rectifiers 94 and 96 decreases below the sustaining value these rectifiers will become non-conducting. This is described more fully in the said copending application Serial No. 159,694, now Patent No. 3,118,105. Prior to the time, that the filter 26 decreased the current flow below the sustaining value, the core of the transformer 142 saturated to remove the conducting pulse which caused the controlled rectifiers 94 and 96 to fire. Prior to the rendering of the rectifier 90 and 92 conductive the reverse current will flow through the diodes 102 and 104 as described above in connection with the operation of the inverter 2. The portion of the operation up to the reversal of the current flow is illustrated by the shaded portion of the current wave I which is located between the time $t_0$ and $t_1$. The unshaded portion of the current wave I between the times $t_1$ and $t_2$ is representative of the current flow when the controlled rectifiers 94 and 96 are not conducting and current is flowing through the diodes 102 and 104.

At the time $t_2$ the potential from the signal source 42 will reverse and, since the load current has reversed, the polarity of the signal from the current sensor 20 will be in additive polarity thereby reversing the output voltage between the terminals 56 and 58. This actuates the modifier 46 to energize the transformer 114 in the opposite polarity with its dotted terminals positive with respect to the undotted terminals resulting in the firing of the controlled rectifiers 90 and 92. Current as represented by the curve I between the times $t_2$ and $t_3$ then flows. At the time $t_3$, the filter causes the current to decrease until the controlled rectifiers 90 and 92 are rendered non-conductive. During the time interval $t_3$–$t_4$ as represented by the curve I, the diodes 106 and 108 conduct. At the time $t_4$, the signal source 42 will again reverse its output polarity providing a voltage which in conjunction with the output of current sensor 20 makes the terminal 58 positive with respect to the terminal 56 to actuate the modifier 46 to fire the controlled rectifiers 94 and 96. Current will now flow as previously described and as represented by the current curve I between the times $t_4$ and $t_5$. Under stable operating conditions continued oscillations of the signal source will continue to provide a current flow as indicated by the curve I between the times $t_1$ and $t_5$.

The description thus far is directed to the operation of the inverting apparatus 1 when the load is such that the filter reflects a capacitive impedance back to the output terminals 8 and 10 of the inverter 2. The operation of the apparatus 1 under abnormal conditions can best be observed by reference to the voltage wave $V_{204}$ which represents the square wave of voltage appearing across the diode network 204, curve $V_{206}$ which represents the voltage which appears across the diode network 206, curve $V_{44}$ which represents the output voltage of the signal control 44, and curve I, as for example, between the times $t_9$–$t_{19}$. The current transformer 208 of the sensor 20 energizes its output terminals 72 and 74 at a polarity which is dependent upon the direction of current flow through the current sensor. The voltage magnitude of this output is determined by the drop across the diode network 206 and is independent of the magnitude of the current flowing through the sensor. The source 42 energizes its output terminals with an alternating voltage which is supplied to the diode network 204 through a voltage dropping resistor 205. The voltage drop across the diode network 204 is independent of the voltage magnitude at the terminals 60–62 and is designated by the value $V_{204}$. The voltage wave $V_{44}$ represents the voltage supplied by the signal control 44 to the modifier 46 and is the sum of the voltages $V_{204}$ and $V_{206}$. When the voltage $V_{44}$ exceeds the threshold voltages $T_1$ and $T_2$ of the signal modifier 46 and is in a polarity to fire the blocked one of the transistors 134 and 136 the signal modifier 46 is actuated and provides a voltage pulse at its output terminals 8 and 10 as represented by the curves $V_{46}$.

In the portion of FIG. 9 prior to the time interval $t_8$ the time intervals at which the voltage peaks $V_{46}$ occur are at the time that the voltage $V_{204}$ from the signal source 42 reverses. This, as described above, is the normal operation of the inverter apparatus 1 in which the load and filter are balanced to provide a current I which decreases to zero prior to the reversal of the output polarity of the signal source 42.

In the event, that the load becomes sufficiently inductive, for any reason whatsoever, so that the impedance presented to the output terminals of the inverter 2 by the filter 26 will no longer be capacitive, the current will persist as indicated by the portion of the curve I between the time intervals $t_9$ and $t_{11}$. Under these conditions, if, at the time $t_{10}$, the inverter 2 should be actuated to fire the controlled rectifiers 90–92 (the rectifiers 94–96 being assumed to be the rectifiers which supply power from the source during the shaded portions of curves I above the zero axis) a low impedance short would be placed between the buses 98 and 100. This is because, as indicated by the curve I, the controlled rectifiers 94 and 96 are still conducting. The current sensor 20 under these conditions will indicate the continued flow of current through the rectifier 94–96 and the voltage $V_{206}$ developed by the sensor 20 will remain positive and in opposition to the voltage $V_{204}$ whereby the output voltage $V_{44}$ will be held less than the threshold voltage $T_2$. At the time $t_{11}$, the curve I will go through zero thereby rendering the controlled rectifiers 94 and 96 non-conductive.

At the time $t_{11}$, the current output of the inverter 2 reverses thereby reversing current flow through the diode network 206 and the voltage $V_{206}$ will reverse. When this happens, the voltages $V_{206}$ and $V_{204}$ add together to provide a negative voltage $V_{44}$ which is greater than the threshold voltage $T_2$ and the signal modifier 46 is thereupon actuated to reverse the conductive condition of its transistors 134 and 136. This provides a voltage output spike $V_{46}$ very close to the time $t_{11}$ which pulses the transformer 114 of the inverter 2 to render the controlled rectifiers 90 and 92 conducting. Current from the buses 84–86 will now flow from the source through the inverter 2 and the current sensor into the filter 26. This is indicated by the current line I between the times $t_{11}$ and $t_{14}$.

At the time $t_{12}$ the voltage signal $V_{204}$ reverses to become positive but at this time the voltage signal $V_{206}$ is still negative whereby the voltage $V_{44}$, while reversing in polarity, still remains below the threshold voltage $T_1$ required to actuate the signal modifier 46. No output voltage spike $V_{46}$ will be generated and the signal modifier will not be actuated.

At the time $t_{13}$, the voltage $V_{204}$ again becomes negative reversing the polarity of the voltage $V_{44}$ and driving it above the threshold value $T_2$. As indicated, there is no spike $V_{46}$ at the time $t_{13}$ because there is no reversal of conduction of the transistors 134 and 136. At the time $t_{14}$, the current I goes through zero and the controlled rectifiers 90 and 92 become non-conducting and the diodes 106 and 108 conduct for the time interval to $t_{14}$–$t_{15}$. At the time $t_{14}$, the voltages $V_{204}$ and $V_{206}$ are in opposite polarity and the output of the voltage $V_{44}$ to the signal modifier 46 is below the threshold value $T_1$. This condition persists until the time $t_{15}$ when the voltage $V_{204}$ reverses. The output voltage $V_{44}$ then becomes greater than the threshold value $T_1$ and the conductivity of the transistors 134 and 136 reverses. This provides a voltage spike $V_{46}$ in a direction to render the controlled rectifiers 94 and 96 conducting.

The current between the inverter 2 and filter 26 will flow as indicated by the line I during the time period $t_{15}$–$t_{17}$. At the time $t_{17}$ the voltage $V_{206}$ reverses whereby the voltage $V_{44}$ exceeds the threshold voltage $T_2$ to cause the modifier to provide a voltage spike $V_{46}$ substantially at the time $t_{17}$ which fires the rectifiers 90–92 to provide the current as indicated by I during the interval $t_{17}$–$t_{18}$. At the time $t_{18}$ the current reverses whereby the rectifiers 90–92 become non-conducting, the reversal of the current reverses the voltage $V_{206}$. At the time $t_{18}$ the voltage $V_{204}$ also reverses and a pulse $V_{46}$ is supplied to the inverter 2. It is assumed that at the time $t_{19}$ the normal conditions occur and the apparatus 1 will operate as described during the period $t_1$–$t_5$.

The voltage $V_{206}$ has been illustrated as changing polarity at exactly the same time that the current I went through its zero condition. This is only approximately true and any time difference would be too small to illustrate in FIG. 9. In many instances, sufficient time will elapse from the time that the current through one set of controlled rectifiers 90–92 or 94–96 terminates before the circuit will fire the other set of controlled rectifiers 94–96 or 90–92 to permit sufficient time for the set of controlled rectifiers which had just become non-conducting to regain their ability to maintain voltage thereacross. In the event that it is desired to change this time interval, it may be accomplished, as shown in FIG. 7, by providing a capacitor 228 in shunt circuit with the diode network 206 whereby the potential across the diode network 206 will persist for a predetermined time interval, as for example 50 microseconds, after the termination of the signal across the input terminals 64 and 66.

Another way of maintaining this time interval is illustrated in FIG. 8 wherein an additional winding 232 is placed on the current transformer. This winding, when connected to be energized from the output voltage as distinguished from being energized by the output current of the inverter 2, phase shifts the potential induced in the winding 212 so that instead of the output voltage thereof leading the current flow through the primary winding 210A the output voltage of the winding 212A will lag the current flow in the primary 210A. This lag will maintain the signal across the diode network 206 for a predetermined time interval, such as the aforementioned 50 microseconds, to insure that the controlled rectifiers which are terminating conduction will have time to reform sufficiently to sustain voltage prior to the firing of the other set of controlled rectifiers.

Since numerous changes may be made in the above-described construction and different embodiments of the invention may be made without departing from the spirit and scope thereof, it is intended that all matter contained in the foregoing description as shown in the accompanying drawings shall be interpreted as illustrative and not in a limiting sense.

What is claimed and is desired to be secured by United States Letters Patent is as follows:

1. In an electrical network, first and second electric valves, said valves each having power circuit and a control circuit and being of the discontinuous control type in which said control circuit controls the initiation of current flow through its associated said power circuit but is ineffective to interrupt current flow therethrough, a source of alternating potential signals, means including a signal control apparatus connecting said source to said control circuits of said valves such that when said signals are of a first polarity and of at least a first magnitude said control circuit of said first valve will be actuated to initiate current flow through said power circuit of said first valve and such that when said signals are of a second plurality and of at least a given magnitude said control circuit of said second valve will be actuated to initiate current flow through said power circuit of said second valve, a current sensor energized as a consequence of current flow through said power circuits and connected to said signal control apparatus, said sensor being effective to supply a first and a second control potential in response to conduction of said power circuits of said first and second valves respectively, said first control potential being of said first polarity and of a predetermined magnitude, said second control potential being of said second polarity and of a desired magnitude, said signal control apparatus being effective in response to the existence of said first control potential to prevent signals of said second polarity and said given magnitude from being supplied to said control circuit of said second valve and being effective in response to the existence of said second control potential to prevent signals of said first polarity and said first magnitude from being supplied to said control circuit of said first valve.

2. The combination of claim 1 in which the magnitudes of said first and second control potentials are independent of the current magnitude through said power circuits.

3. In an electrical network; an inverter for inverting direct potential electrical energy into alternating potential energy comprising first and second electric valves, each said valve having a power circuit and a control circuit for rendering its associated said power circuit conductive, a first power path including said first valve power circuit, a second power path including said second valve power circuit, and an output network connected to said paths and energized with alternating potential as a consequence of the alternating conduction of said valves; a source of alternating polarity control potential of predetermined magnitude; a signal control having first and second input circuits, an output circuit, and a network interconnecting said circuits such that the potential at said output circuit is the algebraic sum of the potentials at said input circuits; a current sensor having an input circuit connected to said output network of said inverter and having an output circuit connected to said first input circuit of said signal control, said sensor being responsive to the current flow in said inverter output network and establishing first and second polarity potentials in said first input circuit of said signal control in response to current flow in said first and said second paths; said source control potential being connected to said second input circuit of said signal control and said output circuit of said signal control being connected to said control circuits of said valves such that with zero input potential to said first input circuit of said signal control said power circuits of said valves will be alternately rendered conducting; said output circuit of said sensor being connected to said first input circuit of said signal control in such polarity relative to the polarity of said control potential that the existence of said first polarity potential to prevent the actuation of said control circuit of said second valve and the existence of said second polarity potential to prevent the actuation of said control circuit of said second valve.

4. In an electrical network, an inverter having power input and power output terminals and a pair of electric valves controlling the energization of said output terminals whereby the conduction of a first of said valves energizes said output terminals in a first polarity and the conduction of the second of said valves energizes said output terminals in a second polarity, said inverter being characterized by the fact that successive electrical pulses supplied thereto successively render alternate ones of said valves conductive, a signal modifier operatively connected to said inverter for supplying said successive electrical pulses thereto in response to the reception thereby of a control signal, a control signal source for generating said control signals means including a signal control connecting said control signal source to said signal modifier whereby said control signal source is operable to supply said control signals to said signal modifier, a current sensor connected to be actuated in response to current flow through said valves, said sensor being operable to generate a first signal in response to conduction of one of said valves and a second signal in response to conduction of the other of said valves, and means connecting said sensor to said signal control, said signal control being operable in response to said sensor first signal to prevent certain of said control signals from being supplied to said signal modifier and operable in response to said sensor second signal to prevent other of said control signals from being supplied to said signal modifier.

5. In an electrical network, an inverter having power input and power output terminals and a pair of electric valves controlling the energization of said output terminals whereby the conduction of a first of said valves energizes said output terminals in a first polarity and the conduction of the second of said valves energizes said output terminals in a second polarity, said inverter being characterized by the fact that successive electrical pulses supplied thereto successively render alternate one of said valves conductive, a signal modifier operatively connected to said inverter for supplying said successive electrical pulses thereto in response to the reception thereby of a control signal, a control signal source for generating said control signals means including a signal control connecting said control signal source to said signal modifier whereby said control signal source is operable to supply said control signals to said signal modifier, a current sensor connected to be actuated in response to current flow through said valves, said sensor being operable to generate a first signal in response to conduction of one of said valves and a second signal in response to conduction of the other of said valves, means connecting said sensor to said signal control, said signal control being operable in response to said sensor first signal to prevent certain of said control signals from being supplied to said signal modifier and operable in response to said sensor second signal to prevent other of said control signals from being supplied to said signal modifier, and time delay means for delaying the resumption of said control signals to said signal modifier subsequent to the termination of current flow through said valves.

6. In an electrical network, an inverter having power input and power output terminals and a pair of electric valves controlling the energization of said output terminals whereby the conduction of a first of said valves energizes said output terminals in a first polarity and the conduction of the second of said valves energizes said output terminals in a second polarity, said inverter being characterized by the fact that successive electrical pulses supplied thereto successively render alternate one of said valves conductive, a signal modifier operatively connected to said inverter for supplying said successive electrical pulses thereto in response to the reception thereby of a control signal, a control signal source for generating said control signals, means including a signal control connecting said control signal source to said signal modifier whereby said control signal source is operable to supply said control signals to said signal modifier, a current sensor connected to be actuated in response to current flow through said valves, said sensor being operable to generate a first signal in response to conduction of one of said valves and a second signal in response to conduction of the other of said valves, means connecting said sensor to said signal control, said signal control being operable in response to said sensor first signal to prevent certain of said control signals from being supplied to said signal modifier and operable in response to said sensor second signal to prevent other of said control signals from being supplied to said signal modifier, and time delay means actuated by said sensor for delaying the resumption of said control signals to said signal modifier subsequent to the termination of said sensor signals.

7. In an electrical network, an inverter having power input and power output terminals and first and second semiconductor valves of the discontinuous control type, each of said valves having a power circuit and a control circuit for controlling the initiation of conduction through its associated said power circuit in response to an initiating electrical pulse, said inverter including first and second power paths interconnecting said input and output terminals and individually including said power circuits of said first and said second valves respectively, a signal modifier adapted to generate said initiating pulses in response to the application of an alternating potential thereto, said modifier being operatively connected to said control circuits and arranged such that first alternate ones of said initiating pulses will render conductive said power circuit of said first valve and second alternate ones of said initiating pulses will render conductive said power circuit of said second valve, a signal source adapted to generate said alternating potential, a signal control having first and second pairs of control voltage input terminals and a pair of control voltage output terminals, said signal control including summing circuitry interconnecting said pairs of terminals, said summing circuitry being effective to supply an electrical quantity to said output terminals, said quantity being the sum of the electrical quantities supplied to said pairs of input terminals, said first control input terminals being connected to said signal source, said control output terminals being connected to said signal modifier, and a current sensor connected to said inverter to respond to current flow through said power circuits and having an output potential which is of a first polarity in response to current flow through said power circuit of said first valve and is of a second polarity in response to current flow through said power circuit of said second valve, means connecting said sensor to said second pair of control voltage input terminals, said signal control being effective in the absence of said output potential from said sensor to supply said alternating potential to said signal modifier, said modifier being operable to supply said first alternate initiating pulses in response to a first polarity of said alternating potential and said second alternate initiating pulses in response to the second polarity of said alternating potential, said current sensor being connected to said control voltage input terminals such that said first polarities are in series additive relation and said second polarities are in series additive relation.

8. In an electrical network, an inverter having power input and power output terminals and first and second semiconductor valves of the discontinuous control type, each of said valves having a power circuit and a control circuit for controlling the initiation of conduction through its associated said power circuit in response to an initiating electrical pulse, said inverter including first and second power paths inter-connecting said input and output terminals and individually including said power circuits of said first and said second valves respectively, a signal modifier adapted to generate said initiating pulses in response to the application of an alternating potential thereto, said modifier being operatively connected to said control circuits and arranged such that first alternate ones of said initiating pulses will render conductive said power circuit of said first valve and second alternate ones of said initiating pulses will render conductive said power circuit of said valve, a signal source adapted to generate said alternating potential, a signal control having first and second pairs of control voltage input terminals and a pair of control voltage output terminals, said signal control including summing circuitry interconnecting said pairs of terminals, said summing circuitry being effective to supply an electrical quantity to said output terminals, said quantity being the sum of the electrical quantities supplied to said pairs of input terminals said first control input terminals being connected to said signal source, said control output terminals being connected to said signal modifier, a current sensor connected to said inverter to respond to current flow through said power circuits and having an output potential which is of a first polarity in response to current flow through said power circuit of said first valve and is of a second polarity in response to current flow through said power circuit of said second valve, means connecting said sensor to said second pair of control voltage input terminals, said signal control being effective in the absence of said output potential from said sensor to supply said alternating potential to said signal modifier, said modifier being operable to supply said first alternate initiating pulses in response to a first polarity of said alternating potential and said second alternate initiating pulses in response to the second polarity of said alternating potential, said current sensor being connected to said control voltage input terminals such that said first polarities are in series additive relation and said second polarities are in series additive relation, and time delay means for delaying the decay of said first and said second polarities of said output potential with respect to the termination of current flow through said power circuits of first and second valves respectively.

9. In an electrical network, an inverter having power input and power output terminals and first and second semiconductor valves of the discontinuous control type, each of said valves having a power circuit and a control circuit for controlling the initiation of conduction through its associated said power circuit in response to an initiating electrical pulse, said inverter including first and second power paths interconnecting said input and output terminals and individually including said power circuits of said first and said second valves respectively, a signal modifier adapted to generate said initiating pulses in response to the application of an alternating potential thereto, said modifier being operatively connected to said control circuits and arranged such that first alternate ones of said initiating pulses will render conductive said power circuit of said first valve and second alternate ones of said initiating pulses will render conductive said power circuit of said second valve, a signal source adapted to generate said alternating potential, a signal control having first and second pairs of control voltage input terminals and a pair of control voltage output terminals, said signal control including summing circuitry interconnecting said pairs of terminals, said summing circuitry being effective to supply a quantity to said output terminals, said quantity being the sum of the quantities supplied to said pairs of input terminals, said second control input terminals, said first control input terminals being connected to said signal source, said control output terminals being connected to said signal modifier and a pair of load supplying terminals, a current transformer having a primary winding and a secondary winding, said primary winding being connected between one of said inverter terminals and one of said load supplying terminals to respond to current flow through said path, said secondary winding having an output potential which is of a first polarity in response to current flow through said first path and is of a second polarity in response to current flow through said second path, means connecting said secondary winding to said second pair of control voltage input terminals, said signal control being effective in the absence of said output potential from said sensor to supply said alternating potential to said signal modifier, said modifier being operable to supply said first alternate initiating pulses in response to a first polarity of said alternating potential and said second alternate initiating pulses in response to the second polarity of said alternating potential, said secondary winding being connected to said control voltage input terminals such that said first polarities are in series additive relation and said second polarities are in series additive relation.

10. In an electrical network, an inverter having a pair of power input terminals and a pair of power output terminals, first and second power paths interconnecting said pairs of terminals, first and second unidirectional conducting semiconductor valves of the discontinuous control type individually connected in said first and second paths respectively to control the flow of electrical energy from said input terminals to said output terminals, first and second asymmetric devices individually connected in said first and second paths to permit the flow of electrical energy from said output terminals to said input terminals, a pair of load supplying terminals, a current sensor including an energizable element having first and second connections energized to first and second relative polarities as a consequence of alternating current flowing through said energizable element, a filter having input terminals connected to said power output terminals through said current sensor and having output terminals connected to said load terminals, said filter including reactive elements to make said filter reflect a capacitive impedance to said power output terminals when the inductive impedance presented to said load terminals is below a critical value, a source of alternating control potential, a pulse producing network having control input terminals and pulsatingly energized pulse output terminals, circuit means connecting said pulse output terminals to said control circuits of said valves whereby alternate successive first pulses and alternate successive second pulses at said pulse output terminals will cause said power circuits of said first and said second valves to be rendered conductive sequentially for flow of electrical energy from said power input terminals to said power output terminals, a signal control network having three pairs of terminals, said signal control including summing circuitry interconnecting said pairs of terminals, said summing circuitry being effective to supply an electrical quantity to a second of said pairs of terminals, said quantity being the sum of the quantities supplied to a first and a third pair of said terminals, said first pair of terminals of said signal control network being connected to said source of alternating control potential, said second pair of terminals of said signal control network being connected to said control input terminals of said pulse producing network, said third pair of terminals of said signal control network being connected to said first and second connections of said energizable element of said sensor, said source of control potential being of a magnitude such that in the absence of a current through said sensor said control potential is effective to actuate said pulse producing network, first and second connections of said energizable elements points being selected so as to produce potentials between said third pair of terminals of said control network which will render said source of said control potential ineffective to actuate said pulse producing network into a condition to provide the one of said first and second pulses which will render conductive said power circuit of said first and said valves which will cause a reversal of current between said power output terminals.

11. In an electrical network, an inverter having a pair of power input terminals and a pair of power output terminals, first and second power paths interconnecting said pairs of terminals, first and second unidirectional conducting semiconductor valves of the discontinuous control type individually connected in said first and said second paths respectively to control the flow of electrical energy from said input terminals to said output terminals, first and second diodes individually connected in said first and second paths to permit the flow of electrical energy from said output terminals to said input terminals, a pair of load supplying terminals, a current transformer having a primary winding and a secondary winding, a filter having input terminals connected to said power output terminals through said primary winding and having output terminals connected to said load terminals, said filter including reactive elements to make said filter reflect a capacitive impedance to said power output terminals when the inductive impedance presented to said load terminals is below a critical value, a source of square wave alternating control potential, a signal control network having first and second and third pairs of terminals, said signal control including summing circuitry interconnecting said pairs of terminals, said summing circuitry being effective to supply an electrical quantity to said second pair of terminals, said quantity being the sum of the quantities supplied to said first and said third pairs of terminals, said first pair of terminals of said signal control network being connected to said square wave control potential, impedance means connected between said third pair of terminals of said signal control network, a pulse producing network adapted to generate pulses of alternating polarity across a pair of output terminals in response to the application of a square wave potential to a pair of input terminals and of at least a predetermined magnitude, said input terminals of said pulse network being connected to said second pair of terminals of said signal control network, the magnitude of said square wave control potential being at least as great as said predetermined magnitude, said pulse producing network being responsive to half cycles of a first and second polarity of said square wave control potential to energize its said output terminals with pulses of first and second polarities respectively, said control circuits of said valves being connected to said pulse producing network such that said pulses of said first and second polarities render said power circuits of said first and second valves conductive respectively, said secondary winding being connected across said third pair of terminals of said signal control network in a polarity such that the potential established by said impedance means opposes said first and second polarities of said square wave as a consequence of current conduction through said power circuits of said second and said first valve respectively, the magnitude of the potential established across said impedance means being sufficiently great so that when it is subtracted from the magnitude of said square wave potential the difference magnitude is less than said predetermined magnitude required to actuate said pulse producing network.

12. The combination of claim 11 in which said impedance means comprises a pair of semiconductor diodes connected in anti-parallel relationship.

13. The combination of claim 12 in which an energy storage device is connected to be charged by a potential proportional to that appearing between said third pair of terminals of said signal control network.

14. The combination of claim 12 in which said current transformer is provided with an additional winding and said additional winding is connected to be energized by the output voltage of said inverter.

15. In an electrical network, an inverter having a pair of power input terminals and a pair of power output terminals, first and second power paths interconnecting said pairs of terminals, first and second unidirectional conducting semiconductor valves of the discontinuous control type individually connected in said first and said second paths respectively to control the flow of electrical energy from said input terminals to said output terminals, first and second diodes individually connected in said first and second paths to permit the flow of electrical energy from said output terminals to said input terminals, a pair of load supplying terminals, a current transformer having a primary winding and a secondary winding, a filter having input terminals connected to said power output terminals through said primary winding and having output terminals connected to said load terminals, said filter including reactive elements to make said filter reflect a capacitive impedance to said power output terminals when the inductive impedance presented to said load terminals is below a critical value, a source of square wave alternating control potential, a signal control network having first and second and third pairs of terminals, said signal control including summing circuitry interconnecting said pairs of terminals, said summing circuitry being effective to supply an electrical quantity to said second pair of terminals, said quantity being the sum of the quantity supplied to said first and said third pairs of terminals, said first pair of terminals of said signal control network being connected to said square wave control potential, impedance means connected between said third pair of terminals of said signal control network, a pulse producing network adapted to generate pulses of alternating polarity across a pair of output terminals in response to the application of a square wave potential to a pair of input terminals and of at least a predetermined magnitude, said input terminals of said pulse network being connected to said second pair of terminals of said signal control network, the magnitude of said square control potential being at least as great as said predetermined magnitude, said pulse producing network being responsive to half cycles of a first and second polarity of said square wave control potential to energize its said output terminals with pulses of first and second polarities respectively, said control circuits of said valves being connected to said pulse producing network such that said pulses of said first and second polarities render said power circuits of said first and second valves conductive respectively, said secondary winding being connected across said third pair of terminals of said signal control network in a polarity such that the potential established by said impedance means opposes said first and second polarities of said square wave as a consequence of current conduction through said power circuits of said second and said first valve respectively, the magnitude of the potential established across said impedance means being sufficiently great so that when it is subtracted from the magnitude of said square wave potential the difference magnitude is less than said predetermined magnitude acquired to actuate said pulse producing network, and time delay means for delaying the disappearance of the potential established across said impedance means subsequent to termination of current flow through the one of said power circuits which established said potential across said impedance means.

16. In an electrical energy inverter for converting unidirectional potential into alternating potential; an inverter having a pair of inverter input terminals adapted to be connected to an electrical energy source, a pair of inverter output terminals adapted to be connected to a load, first and second electric valves each having a power circuit and a control circuit for initiating the flow of electrical energy through said power circuit, a first power path connecting said pairs of inverter terminals and including said power circuit of said first valve and effective to conduct current between said inverter output terminals in a first direction, and a second power path connected to said inverter output terminals and effective to conduct current between said inverter output terminals in a second direction; a signal source having a pair of pulsatingly energized signal output terminals; a signal control having a first pair of control input terminals connected to said signal output terminals, a second pair of control input terminals, and a pair of control output terminals energizable into first and second energized conditions by said source, said signal control being effective at a first energized condition of said second pair of control input terminals to prevent the energization of said control output terminals to said first energized condition and being effective at a second energized condition of said second pair of control input terminals to prevent the energization of said control output terminals to said second condition, means connecting said control output terminals to said control circuits of said valve such that when said control output terminals are in said first energized condition said power circuit of said first valve is rendered conducting and when said control output terminals are in said second energized condition said power circuit of said second valve is rendered conducting; and a current sensor operatively connected to said inverter and having a pair of output terminals connected to said second pair of control input terminals and effective in response to current flow through said power circuit of said first valve to energize said second pair of control input terminals to said second energized condition and effective in response to current flow through said power circuit of said second valve to energize said second pair of control input terminals to said first energized condition.

17. In an electrical network for energizing an alternating polarity load from a unidirectional polarity energy supply, a pair of input terminals adapted to be energized in unidirectional polarity from said supply, a pair of output terminals, first and second electric switching devices, each of said devices including a power path and a control circuit for rendering its said power path conductive, said control circuit being ineffective to interrupt current flow through its said power path, a first energy conducting path connecting said input teminals to said output terminals through said power path of said first device, said first energy path being effective when said power path of said first device is conductive to connect said output terminals to said input terminals in a first polarity, a second energy conducting path connecting said input terminals to said output terminals through said power path of said second device, and second energy path being effective when said power path of said second device is conductive to energize said output terminals to said input terminals in a second polarity, control means for alternately rendering said power paths conductive at a desired frequency whereby said output terminals are energized with an alternating polarity at said desired frequency, said control means comprising a source of first and second series of pulsating signals, each said series being of a fixed frequency relative to said desired frequency, said first and second signals occurring in alternating succession, and means operatively connecting said source to said control circuits whereby said signals of said first series are supplied to said control circuit of said first switching device and said signals of said second series are supplied to said control circuit of said second switching device, said last-named means including a signal blocking device having a first operating condition in which said signals of both said series are supplied to their respective said control circuits whereby said control circuits are actuated alternately and said main circuits are thereby rendered conductive alternately, said signal blocking device having a second condition which blocks the flow of said signals of at least one of said series of said signals, current flow sensing means connected to said paths and energized by the current flow through said switching devices, means connecting said current sensing means to said signal blocking device, said current sensing means being operable when energized by current flow through said main circuit of one of said switching devices to actuate said signal blocking device into a second operating condition to block the flow of said signals to the other of said switching devices.

18. The combination of claim 17 in which there is provided, apparatus connected to said output terminals, said apparatus including current flow interrupting means, said interrupting means being effective to interrupt current flow through each said switching device at the expiration of a time period, said time period having at least a first time period, said first period being greater than the half cycle time period of said desired frequency.

19. The combination of claim 17 in which there is provided a variable magnitude load, load energizing means connecting said load to said output terminals, said energizing means including reactive means, the magnitude of said reactance means with respect to a normal value of said load magnitude being such as to provide a leading current flow through said energy paths at said desired frequency whereby the time period of current flow through said energy paths is less than the half cycle time period of said desired frequency, said magnitude of said reactance means being such that with a second magnitude of said load the time period of current flow through said energy paths is greater than the half cycle time period of said desired frequency.

20. The combination of claim 19 in which said load is inductive in nature, said reactive means is capacitive in nature, and includes an energy accumulating device through which substantially all of the current flow between said output terminals must pass.

References Cited by the Examiner

UNITED STATES PATENTS

| | | | |
|---|---|---|---|
| 2,025,471 | 12/1935 | Osborne | 323—128 X |
| 2,329,735 | 9/1943 | Winograd | 321—14 |
| 2,631,267 | 3/1953 | Bivens | 321—14 |
| 3,046,412 | 7/1962 | Seike | 321—14 X |
| 3,098,949 | 7/1963 | Goldberg | 317—52 X |
| 3,118,105 | 1/1964 | Relation et al. | 321—45 |
| 3,119,058 | 1/1964 | Genuit | 321—18 X |
| 3,120,633 | 2/1964 | Genuit | 321—18 X |
| 3,120,634 | 2/1964 | Genuit | 321—18 X |
| 3,129,374 | 4/1964 | Relation | 317—33 X |
| 3,132,287 | 5/1964 | Yarbrough. | |
| 3,147,400 | 9/1964 | McClay | 317—33 X |

LLOYD McCOLLUM, *Primary Examiner.*

J. C. SQUILLARO, W. H. BEHA, *Assistant Examiners.*